(12) United States Patent
Dong (10) Patent No.: US 11,787,463 B2
(45) Date of Patent: Oct. 17, 2023

(54) STEERING APPARATUS AND ALL-TERRAIN VEHICLE

(71) Applicant: SEGWAY TECHNOLOGY CO., LTD., Changzhou (CN)

(72) Inventor: Zhen Dong, Changzhou (CN)

(73) Assignee: SEGWAY TECHNOLOGY CO., LTD., Changzhou (CN)

( * ) Notice: Subject to any disclaimer, the term of this patent is extended or adjusted under 35 U.S.C. 154(b) by 0 days.

(21) Appl. No.: 17/869,984

(22) Filed: Jul. 21, 2022

(65) Prior Publication Data
US 2022/0388565 A1 Dec. 8, 2022

(30) Foreign Application Priority Data
Jul. 21, 2021 (CN) .......................... 202121672115.7

(51) Int. Cl.
*B62D 3/12* (2006.01)
*F16H 57/023* (2012.01)
*F16H 57/03* (2012.01)
*F16H 57/029* (2012.01)
*F16H 57/02* (2012.01)

(52) U.S. Cl.
CPC .......... *B62D 3/123* (2013.01); *F16H 57/023* (2013.01); *F16H 57/029* (2013.01); *F16H 57/03* (2013.01); *F16H 2057/02082* (2013.01)

(58) Field of Classification Search
CPC ......... B62D 3/123; B62D 3/12; F16H 57/023; F16H 57/029; F16H 57/03; F16H 2057/02082
See application file for complete search history.

(56) References Cited

U.S. PATENT DOCUMENTS

| 4,296,641 | A | * | 10/1981 | May | F16H 55/283 |
| | | | | | 74/498 |
| 2002/0024190 | A1 | * | 2/2002 | Tanaka | F16H 55/283 |
| | | | | | 280/93.514 |
| 2006/0075840 | A1 | * | 4/2006 | Saito | B62D 3/12 |
| | | | | | 74/422 |
| 2013/0247696 | A1 | * | 9/2013 | Imamura | F16H 55/283 |
| | | | | | 74/30 |
| 2014/0007716 | A1 | * | 1/2014 | Kometani | B62D 3/123 |
| | | | | | 74/30 |

(Continued)

FOREIGN PATENT DOCUMENTS

| CN | 105564494 | A | * | 5/2016 | ............ B62D 3/123 |
| JP | 2000177605 | A | * | 6/2000 | ............ B62D 3/123 |

(Continued)

*Primary Examiner* — Paul N Dickson
*Assistant Examiner* — Matthew D Lee
(74) *Attorney, Agent, or Firm* — Emerson, Thomson & Bennett, LLC; Roger D. Emerson; Jarrett Wyatt (57) ABSTRACT

A steering apparatus and an all-terrain vehicle are provided. The steering apparatus comprises a housing provided with a circumferential movement limiting part; an input shaft disposed in the housing; an output shaft disposed in the housing and being in transmission coupling with the input shaft, wherein the output shaft is movable axially in an axial direction of the output shaft in the housing; and a circumferential movement limiting member disposed on the output shaft and being in fit with the circumferential movement limiting part for limiting circumferential movement.

19 Claims, 5 Drawing Sheets

(56) References Cited

U.S. PATENT DOCUMENTS

| | | | |
|---|---|---|---|
| 2016/0031474 A1* | 2/2016 | Srinivasan | B62D 3/123 |
| | | | 148/695 |
| 2016/0223066 A1* | 8/2016 | Imamura | B62D 3/123 |
| 2017/0158221 A1* | 6/2017 | Yamamoto | F16H 25/20 |
| 2020/0025282 A1* | 1/2020 | Kamaguchi | F16H 57/029 |

FOREIGN PATENT DOCUMENTS

| | | | | |
|---|---|---|---|---|
| JP | 2002193118 A | * | 7/2002 | B62D 3/123 |
| JP | 2006117221 A | * | 5/2006 | B62D 3/12 |

* cited by examiner

STEERING APPARATUS AND ALL-TERRAIN VEHICLE

CROSS REFERENCE

The present disclosure claims priority to Chinese Application No. 202121672115.7 filed on Jul. 21, 2021, and Chinese Application No. 202121671561.6 filed on Jul. 21, 2021 and entitled "ALL-TERRAIN VEHICLE", all of which are incorporated herein by reference in their entirety.

TECHNICAL FIELD

The embodiment of the present disclosure relates to the technical field of vehicles, in particular to a steering apparatus and an all-terrain vehicle.

BACKGROUND

In the prior art, the axial movement of the rack shaft is limited by the heads at both ends of the steering apparatus of a vehicle outputting steering signals, and there is no corresponding structure for limiting the circumferential movement of the rack shaft. When such a steering apparatus is used to a special large-capacity vehicle for a long period of time, the structure of the steering apparatus is not resistant to shock, and abnormal in abrasion, and has large vibration and large movement limiting errors during the period of turning directions, etc., resulting in different degrees of damage such as deformation in steering contact parts, and further affect the performance and safety of the vehicle. Even though the steering apparatus is provided with a structure for limiting the circumferential movement of the teeth on the rack shaft on other vehicles, the strength of the limiting structure is low. When the limiting structure has operated to limit the movement of the teeth for many times, the limiting structure and the movement limiting part of the teeth are seriously worn, which will reduce the reliability of the structure of the steering apparatus.

SUMMARY

The embodiment of the present disclosure aim at solving at least one of the technical problems existing in the prior art. Therefore, the present disclosure proposes a steering apparatus, in which the circumferential movement of the output shaft of the steering apparatus can be limited, so that the stability of the output shaft in the housing can be improved.

The embodiment of the present disclosure further discloses an all-terrain vehicle.

The steering apparatus according to the embodiment of the present disclosure comprises a housing provided with a circumferential movement limiting part; an input shaft disposed in the housing; an output shaft disposed in the housing and is in transmission fit with the input shaft, wherein the output shaft is movable axially in the axial direction of the output shaft in the housing; a circumferential movement limiting member disposed on the output shaft and is in in circumferential movement limiting fit with the circumferential movement limiting part.

Therefore, the circumferential movement limiting member is provided on the output shaft, and the circumferential movement limiting member is in in circumferential movement limiting fit with the circumferential movement limiting part, so that the circumferential movement limiting part in the housing will limit the circumferential rotation of the circumferential movement limiting member, thus limiting the circumferential rotation of the output shaft, thereby improving the stability and reliability of the installation of the output shaft in the housing.

According to some embodiments of the present disclosure, the circumferential movement limiting part is a through hole extending in the axial direction of the output shaft on the housing, and the circumferential movement limiting member is provided in the through hole and is movable along the through hole when being driven by the output shaft.

According to some embodiments of the present disclosure, the through hole is an elongated hole, the elongated hole comprises two short side walls which are opposite in the axial direction and two long side walls which are opposite in the circumferential direction, and the two long side walls are provided with limiting surfaces which are in in circumferential movement limiting fit with the circumferential movement limiting member for limiting circumferential movement.

According to some embodiments of the present disclosure, the steering apparatus further comprises a mounting bracket, wherein the mounting bracket is configured to mount a steering rod, and the mounting bracket is provided on the circumferential movement limiting member and is movable synchronously with the circumferential movement limiting member.

According to some embodiments of the present disclosure, the steering apparatus further comprises a fastener, wherein the fastener passes through the mounting bracket, the circumferential movement limiting member and the output shaft.

According to some embodiments of the present disclosure, the steering apparatus further comprises a dustproof sleeve, wherein the dustproof sleeve is sleeved on the housing and covers the through hole, the circumferential movement limiting member is located inside the dustproof sleeve, and the mounting bracket is located outside the dustproof sleeve.

According to some embodiments of the present disclosure, the circumferential movement limiting member is block-shaped, the dustproof sleeve comprises telescopic sleeves and an intermediate sleeve, the telescopic sleeves are provided at both ends of the intermediate sleeve and are fixedly connected with the housing, respectively, the intermediate sleeve is provided with a flat plate-shaped fitting part, the top of the circumferential movement limiting member protrudes from the through hole, and the circumferential movement limiting member and the mounting bracket are fixedly attached to both sides of the fitting part, respectively.

According to some embodiments of the present disclosure, the output shaft is provided with a concave fitting groove, and the circumferential movement limiting member is fitted in the fitting groove.

According to some embodiments of the present disclosure, the housing is further provided with an axial limiting part, the end of the output shaft is provided with an axial limiting member, and the axial limiting part is in an axial limiting fit with the axial limiting member.

The embodiment of the present disclosure further provides a steering apparatus, which can improve the strength of circumferentially limiting the output shaft by providing the structural reinforcement member, so that the structural reliability of the steering apparatus can be improved.

The embodiment of the present disclosure further discloses an all-terrain vehicle.

The steering apparatus according to the embodiment of the present disclosure comprises a housing, which is formed with an accommodating cavity and a through hole, wherein the through hole is in communication with the accommodating cavity; an input shaft, which is provided in the accommodating cavity; an output shaft, which is provided in the accommodating cavity and is in transmission cooperation with the input shaft, wherein the output shaft is movable in the axial direction of the output shaft in the accommodating cavity; a circumferential movement limiting member, which is disposed on the output shaft and is movable axially synchronously with the output shaft in the through hole; a structural reinforcement member, which is provided in the through hole, wherein the structural reinforcement member is provided with a reinforcement circumferential movement limiting part, and the circumferential movement limiting member is in in circumferential movement limiting fit with the circumferential movement limiting part.

Therefore, in addition to the effect that the circumferential movement limiting part limits the circumferential movement of the circumferential movement limiting member, the fitting strength of limiting the circumferential movement between the circumferential movement limiting part and the circumferential movement limiting member is improved, thereby improving the reliability of the steering apparatus with the structural reinforcement member being disposed in the through hole, and the circumferential movement limiting part being provided on the structural reinforcement member in circumferential movement limiting fitting with the circumferential movement limiting member.

According to some embodiments of the present disclosure, the reinforcement circumferential movement limiting part is a slideway extending in the axial direction of the output shaft, and the circumferential movement limiting member is provided in the slideway and is slidable axially in the slideway.

According to some embodiments of the present disclosure, the housing is provided with a limiting part at the position corresponding to the through hole, and the bottom of the structural reinforcement member is in fit with the limiting part for limiting radial movement.

According to some embodiments of the present disclosure, the limiting part is a limiting step protruding toward the through hole, the limiting step is annular, or the limiting step is provided on opposite side walls of the through hole, and the limiting step extends in the axial direction.

According to some embodiments of the present disclosure, the side of the structural reinforcement member facing the accommodating cavity is a first arc-shaped surface of the reinforcement, the accommodating cavity is provided with a second arc-shaped surface, and the first arc-shaped surface of the reinforcement and the second arc-shaped surface form a complete circle.

According to some embodiments of the present disclosure, the housing is an aluminum housing, and the structural reinforcement member is a steel structural reinforcement member.

According to some embodiments of the present disclosure, the structural reinforcement member is cast in the through hole; or the structural reinforcement member is embedded in the through hole.

According to some embodiments of the present disclosure, the steering apparatus further comprises a mounting bracket, wherein the mounting bracket is configured to mount a steering rod, and the mounting bracket is provided on the circumferential movement limiting member and moves synchronously with the circumferential movement limiting member.

According to some embodiments of the present disclosure, the steering apparatus further comprises a dustproof sleeve, wherein the dustproof sleeve is sleeved on the housing and covers the through hole, the circumferential movement limiting member is located inside the dustproof sleeve, and the mounting bracket is located outside the dustproof sleeve.

The all-terrain vehicle according to the embodiment of the present disclosure comprises the steering apparatus described above.

Additional aspects and advantages of the present disclosure will be set forth in part in the following description, and in part will be obvious from the following description, or may be learned by practice of the present disclosure.

BRIEF DESCRIPTION OF THE DRAWINGS

The above and/or additional aspects and advantages of the embodiments of the present disclosure will become apparent and understandable from the description of the embodiments taken in conjunction with the following drawings, in which.

REFERENCE NUMERICAL

100—steering apparatus;
10—housing; 11—circumferential movement limiting part; 111—movement limiting part;
12—axial movement limiting part; 13—through hole; 14—accommodating cavity;
141—second arc-shaped surface;
20—input shaft;
30—output shaft; 31—fitting groove; 32—axial limiting member;
40—circumferential movement limiting member; 401—movement limiting end surface;
41—mounting bracket; 42—fastener;
50—dustproof sleeve; 51—intermediate sleeve; 511—fitting part; 52—telescopic sleeve;
60—structural reinforcement member; 61—reinforcement circumferential movement limiting part; 62—first arc-shaped surface

DETAILED DESCRIPTION OF THE EMBODIMENTS

The embodiment of the present disclosure is described in detail hereinafter, the embodiments described with reference to the drawings are exemplary, and the embodiments of the present disclosure are described in detail hereinafter.

Figure 1:
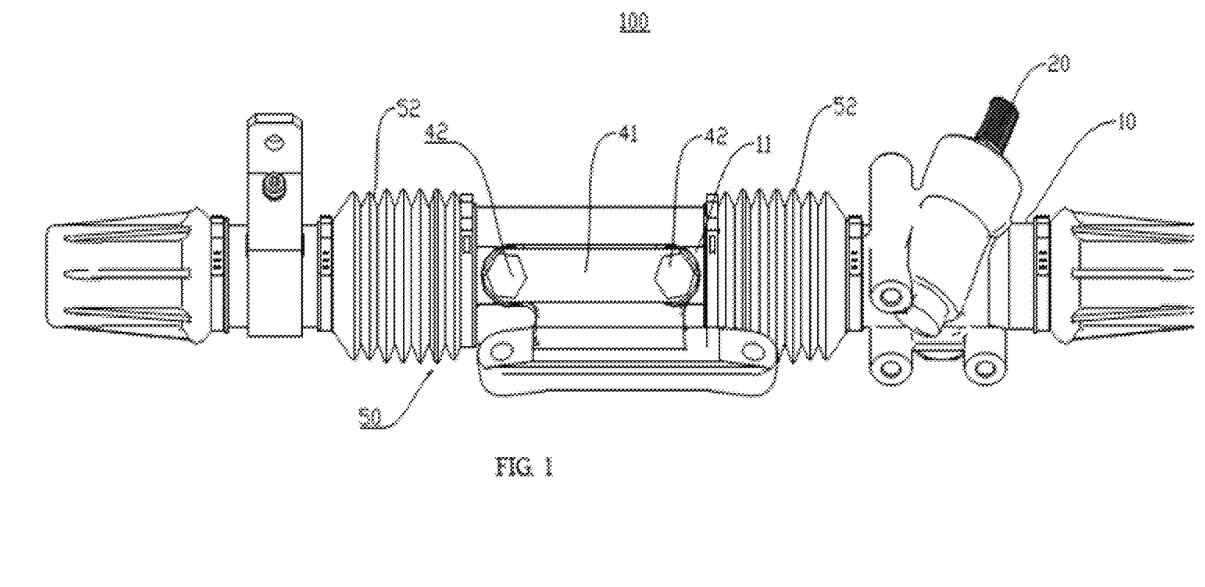
FIG. 1 is a schematic diagram of a steering apparatus according to an embodiment of the present disclosure.
Figure 2:
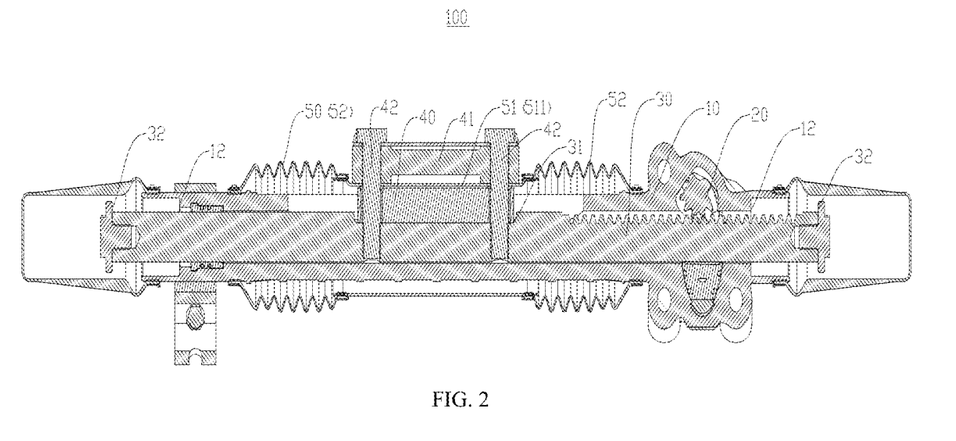
FIG. 2 is a cross-sectional view of a steering apparatus according to an embodiment of the present disclosure.
Figure 3:
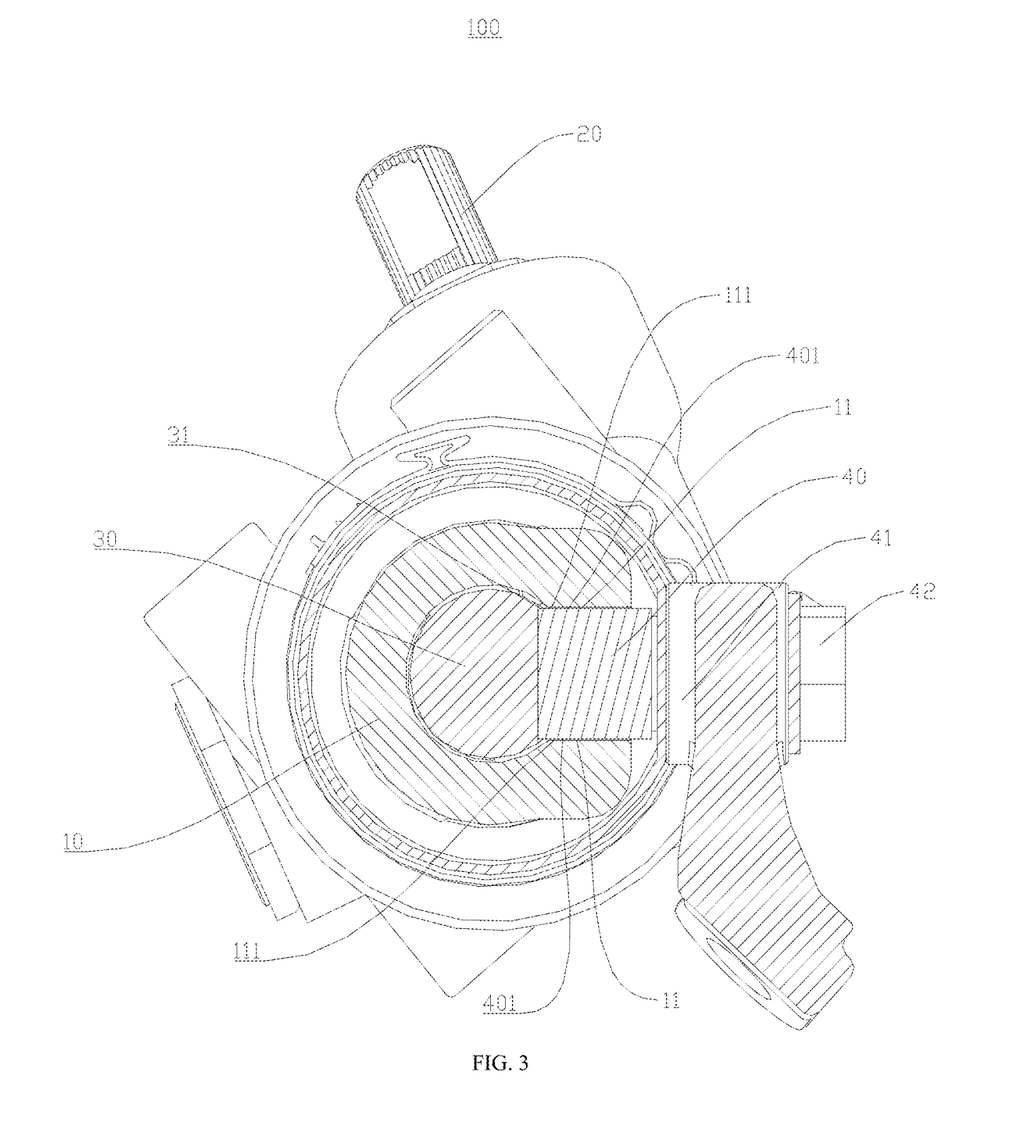
FIG. 3 is a cross-sectional view of a steering apparatus according to an embodiment of the present disclosure.

As shown in FIGS. 1-3, a steering apparatus 100 according to an embodiment of the present disclosure is described hereinafter, and the steering apparatus 100 can be applied to an all-terrain vehicle.

As shown in FIGS. 1-3, the steering apparatus 100 according to the embodiment of the present disclosure can mainly comprise a housing 10, an input shaft 20, an output shaft 30 and a circumferential movement limiting member 40. The housing 10 is provided with a circumferential movement limiting part 11. The input shaft 20 is disposed in the housing 10. The output shaft 30 is disposed in the housing 10 and is in transmission coupling with the input shaft 20. The output shaft 30 is movable axially in the axial direction of the output shaft 30 in the housing 10. The circumferential movement limiting member 40 is disposed on the output shaft 30, and the circumferential movement limiting member 40 is in fit with the circumferential movement limiting part 11 for limiting circumferential movement.

Specifically, both the input shaft 20 and the output shaft 30 are disposed in the housing 10. The housing 10 can separate the input shaft 20 from the output shaft 30 and the outside world, and can prevent the impact of external forces and the erosion of foreign substances from damaging the structures of the input shaft 20 and the output shaft 30, and prevent them from interfering with the transmission coupling between the input shaft 20 and the output shaft 30, thus improving the stability and reliability of the transmission coupling between the input shaft 20 and the output shaft 30.

Further, the input shaft 20 and the output shaft 30 are provided with mutually meshed gear teeth. When the user needs to steer the all-terrain vehicle during driving, the input shaft 20 can rotate in the corresponding direction. The gear teeth rotating on the input shaft 20 will drive the gear teeth on the output shaft 30 to rotate, thus driving the output shaft 30 to convert the rotation into axial movement, realizing the transmission coupling between the output shaft 30 and the input shaft 20, further realizing the stable and reliable steering of the all-terrain vehicle, and improving the driving experience of users.

Further, the circumferential movement limiting member 40 is disposed on the output shaft 30, and the circumferential movement limiting member 40 is in circumferential movement limiting fit with the circumferential movement limiting part 11 on the housing 10. Since the housing 10 is fixed on the all-terrain vehicle, which can remain relatively stable and will not move, when the output shaft 30 tends to steer circumferentially, the circumferential movement limiting member 40 on the output shaft 30 will be in limiting fit with the circumferential movement limiting part 11 on the housing 10, so as to limit the circumferential rotation of the output shaft 30 in the housing 10. This arrangement not only can ensure that the installation of the output shaft 30 in the housing 10 is more stable and firm, but also can improve the impact resistance of the output shaft 30, reduce the wear between the output shaft 30 and the input shaft 20, reduce the rotation limit error, and further improve the structural reliability of the steering apparatus 100.

Therefore, the circumferential movement limiting member 40 is disposed on the output shaft 30, and the circumferential movement limiting member 40 is in circumferential movement limiting fit with the circumferential movement limiting part 11, so that the circumferential movement limiting part 11 of the housing 10 will limit the circumferential rotation of the circumferential movement limiting member 40, thus limiting the circumferential rotation of the output shaft 30, thus improving the stability and reliability of the installation of the output shaft 30 in the housing 10.

As shown in FIG. 2 and FIG. 3, the circumferential movement limiting part 11 is a through hole extending in the axial direction of the output shaft 30 in the housing 10, and the circumferential movement limiting member 40 is disposed in the through hole and moves along the through hole when being driven by the output shaft 30. Specifically, the circumferential movement limiting member 40 is disposed in the through hole extending in the axial direction of the output shaft 30, and the end surfaces of the circumferential movement limiting member 40 facing both ends of the through hole are movement limiting end surfaces 401. This arrangement not only can make the movement limiting end surfaces 401 at both ends of the circumferential movement limiting member 40 abut with and limit both ends of the through hole circumferentially, thus limiting the circumferential rotation of the output shaft 30 in the housing 10, but also when the circumferential movement limiting member 40 abuts with and limits the through hole, make the circumferential movement limiting member 40 move axially along with the axial movement of the output shaft 30 in the through hole, which can prevent the movement limiting fit between the circumferential movement limiting member 40 and the circumferential movement limiting part 11 from influencing the normal axial movement of the output shaft 30, thus improving the steering reliability of the steering apparatus 100.

It should be noted that, when the all-terrain vehicle is running, the wheels will transmit the rotating force to the output shaft 30, so that the output shaft 30 tends to rotate with respect to the housing 10. The circumferential movement limiting fit between the circumferential movement limiting member 40 and the through hole can limit the circumferential rotation of the output shaft 30 with respect to the housing 10, thus preventing the output shaft 30 from rotating with respect to the housing 10 circumferentially and resulting in the wear of the output shaft 30 and the housing 10 and the damage of the output shaft 30 and the housing 10.

As shown in FIG. 2 and FIG. 3, the through hole is an elongated hole, the elongated hole comprises two short side walls which are opposite in the axial direction and two long side walls which are opposite in the circumferential direction, and the two long side walls are provided with movement limiting part 111 which are in circumferential movement limiting fit with the circumferential movement limiting member 40. Specifically, the through hole is provided as an elongated hole, which can allow the output shaft 30 to move along the length direction of the elongated hole, that is, in the axial direction of the housing 10. Moreover, the two short side walls which are opposite in the axial direction on the elongated hole will limit the axial movement range of the output shaft 30, which can prevent the output shaft 30 from moving beyond an unnecessary range, resulting in unreliable power transmission of the steering apparatus 100.

Further, on the one hand, the two long side walls which are opposite in the circumferential direction on the elongated hole can define the direction of axial movement of the output shaft 30, that is, the output shaft 30 can move in one direction for power transmission, so as to prevent the output shaft 30 from shifting in the process of power transmission, resulting in the failure of the steering apparatus 100. On the other hand, the two long side walls which are opposite in the circumferential direction are provided with movement limiting part 111 corresponding to the movement limiting end surfaces 401 of the circumferential movement limiting member 40. The movement limiting fit between the movement limiting end surfaces of the circumferential movement limiting member 40 and the movement limiting surfaces of the long side walls can further improve the stability and firmness of the output shaft 30 in the housing 10.

As shown in FIG. 2 and FIG. 3, the steering apparatus 100 can also mainly comprise a mounting bracket 41, wherein the mounting bracket 41 is configured to mount a steering rod, and the mounting bracket 41 is disposed on the circumferential movement limiting member 40 and moves synchronously with the circumferential movement limiting member 40. Specifically, when the user needs to steer the all-terrain vehicle, the user can rotate the steering wheel, and then drive the input shaft 20 connected with the steering wheel to rotate, so that the gear teeth on the input shaft 20 can rotate. The gear teeth on the input shaft 20 is meshed with the gear teeth on the output shaft 30, so that the gear teeth on the output shaft 30 can rotate, and the rotation of the gear teeth on the output shaft 30 can be converted into the axial movement of the output shaft 30. Moreover, since the circumferential movement limiting member 40 is disposed on the output shaft 30, the circumferential movement limiting member 40 will move axially along with the axial movement of the output shaft 30.

Further, since the steering rod is disposed on the circumferential movement limiting member 40 through the mounting bracket 41, the steering rod can move axially together with the output shaft 30, so that the steering rod can pull the wheels to steer. The steering operation of the all-terrain vehicle can be thus realized, which not only makes the steering rod pull the wheels to steer more stably, but also makes the structure of the steering apparatus 100 more compact, so that the volume of the steering apparatus 100 can be further reduced, and the steering apparatus 100 can be conveniently mounted on the all-terrain vehicle.

As shown in FIGS. 1-3, the steering apparatus 100 can also mainly comprise a fastener 42, wherein the fastener 42 passes through the mounting bracket 41, the circumferential movement limiting member 40 and the output shaft 30. Specifically, the fastener 42 passes through the mounting bracket 41, the circumferential movement limiting member 40 and the output shaft 30, so that the mounting bracket 41, the circumferential movement limiting member 40 and the output shaft 30 can be integrated together, which not only can ensure that the mounting bracket 41 and the circumferential movement limiting member 40 can be stably and firmly mounted on the output shaft 30, and the stability of the output shaft 30 driving the mounting bracket 41 and the circumferential movement limiting member 40 to move axially can be improved, but also can conveniently mount or disassemble the mounting bracket 41 and the circumferential movement limiting member 40 on the output shaft 30 and can simplify the production process of the steering apparatus 100.

As shown in FIG. 1 and FIG. 3, the steering apparatus 100 may also comprise a dustproof sleeve 50, wherein the dustproof sleeve 50 is sleeved on the housing 10 and covers a through hole, the circumferential movement limiting member 40 is located inside the dustproof sleeve 50, and the mounting bracket 41 is located outside the dustproof sleeve 50. Specifically, the dustproof sleeve 50 covers the through hole, so as to separate the inside of the housing 10 from the outside world, and prevent foreign matters from the outside world from entering the housing 10 and damaging the corresponding structure inside the housing 10, so that the service life of the steering apparatus 100 can be prolonged.

Further, the dustproof sleeve 50 is disposed between the circumferential movement limiting member 40 and the mounting bracket 41, which can prevent the dustproof sleeve 50 from influencing the fixed connection between the circumferential movement limiting member 40 and the mounting bracket 41 on the premise of reliably covering the through hole, and can prevent the dustproof sleeve 50 from influencing the axial movement of the circumferential movement limiting member 40 and the mounting bracket 41 along with the output shaft 30, thus improving the reliability and stability of the circumferential movement limiting member 40.

As shown in FIG. 2 and FIG. 3, the circumferential movement limiting member 40 is block-shaped. The dustproof sleeve 50 may comprise telescopic sleeves 52 and an intermediate sleeve 51. The telescopic sleeves 52 are disposed at both ends of the intermediate sleeve 51 and are fixedly connected with the housing 10, respectively. The intermediate sleeve 51 is provided with a flat plate-shaped fitting part 511. The top of the circumferential movement limiting member 40 protrudes from the through hole, and the circumferential movement limiting member and the mounting bracket 41 are fixed on both sides of the fitting part 511, respectively. Specifically, the intermediate sleeve 51 is disposed between the circumferential movement limiting member 40 and the mounting bracket 41, and the circumferential movement limiting member 40 and the mounting bracket 41 are fixedly connected with both sides of the intermediate sleeve 51, so that when the output shaft 30 moves axially, the intermediate sleeve 51 can move axially at the same time, which can prevent the fixing of the dustproof sleeve 50 on the housing 10 from influencing the axial movement of the output shaft 30 on the premise that the dustproof sleeve 50 plays a dustproof role in the steering apparatus 100, and can further improve the reliability of the dustproof sleeve 50.

Further, as shown in FIGS. 1 and 2, the telescopic sleeves 52 are disposed at both ends of the intermediate sleeve 51, and the intermediate sleeve 51 can squeeze or stretch the telescopic sleeves 52 at both ends when moving axially. There are folding lines on the telescopic sleeves 52. When the telescopic sleeves 52 are squeezed or stretched, the folding lines are easily deformed elastically, so that the stability of the overall structure of the dustproof sleeve 50 will not be affected, and the reliability of the dustproof sleeve 50 can be further improved.

As shown in FIG. 2 and FIG. 3, the output shaft 30 is provided with a fitting groove 31, and the bottom of the circumferential movement limiting member 40 is fitted in the fitting groove 31. Specifically, the fitting groove 31 is disposed on the output shaft 30, so that, when the output shaft 30 moves axially, the bottom of the circumferential movement limiting part 11 fits with the fitting groove 31, so as to further improve the stability and firmness of the fixed connection between the circumferential movement limiting member 40 and the output shaft 30, prevent the axial displacement of the circumferential movement limiting part 11 with respect to the output shaft 30 when the output shaft 30 moves axially, and further improve the reliability of the steering apparatus 100.

In some embodiments, as shown in FIG. 2, the circumferential movement limiting member 40 can be disposed in the axial middle of the output shaft 30 as a separate component. For example, the circumferential movement limiting member 40 can be mounted on the output shaft 30 with a fastener 42, which not only makes the weight distribution of the output shaft 30 uniform, but also conveniently disassembles the circumferential movement limiting member 40 from the output shaft 30 when the circumferential movement limiting member 40 is seriously worn and cannot work normally. There is no need to disassemble and replace the whole output shaft 30 and the components on the output shaft 30, which can reduce the maintenance cost of the steering apparatus 100 in the later period. It should be noted that the way in which the circumferential movement limiting member 40 is disposed on the output shaft 30 includes the use of fasteners 42, but it is not limited thereto, which will not be described in detail here.

In some other embodiments, as shown in FIG. 2, the circumferential movement limiting member 40 can be integrally formed in the middle of the output shaft 30. In this way, in addition to ensuring the uniform and stable stress of the output shaft 30, the stability and firmness of the installation of the circumferential movement limiting member 40 on the output shaft 30 can be improved, and the production process can be simplified, so that the difficulty of assembling and producing the steering apparatus 100 can be reduced.

As shown in FIG. 2, the housing 10 is further provided with an axial movement limiting part, the end of the output shaft 30 is disposed with an axial limiting member 32, and the axial movement limiting part is in an axial movement limiting fit with the axial movement limiting member 32. Specifically, in order to prevent the output shaft 30 from moving unnecessarily in the axial direction, the axial movement limiting part 12 on the housing 10 is in an axial movement limiting fit with the axial movement limiting members 32 at both ends of the output shaft 30. Thus, the axial movement range of the output shaft 30 can be limited on the premise of ensuring the smooth axial movement of the output shaft 30 within a certain range, and the stability and reliability of the axial movement of the output shaft 30 can be further improved.

Further, the all-terrain vehicle according to the embodiment of the present disclosure can mainly comprise the steering apparatus 100 described above. The steering apparatus 100 is applicable to an all-terrain vehicle, which can not only reduce the steering limit error of the all-terrain vehicle, but also improve the steering reliability of the all-terrain vehicle, reduce the steering noise of the all-terrain vehicle, and improve the stability and reliability of the all-terrain vehicle.

Figure 4:
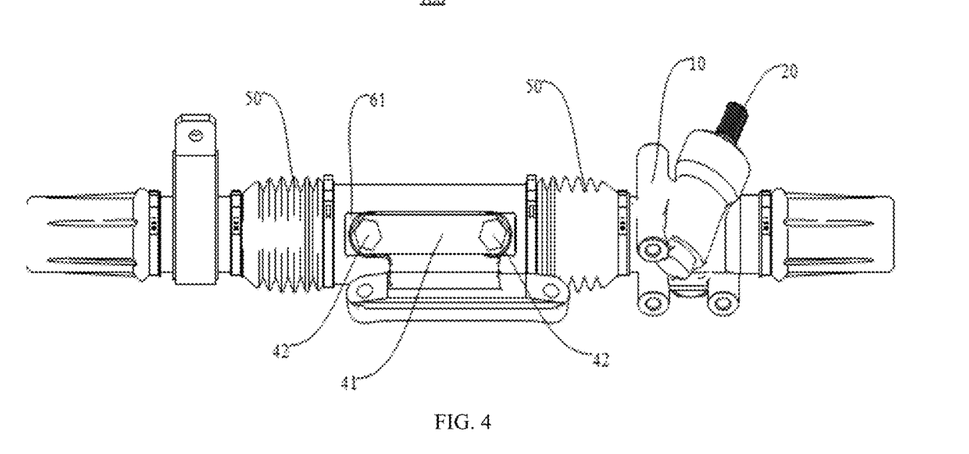
FIG. 4 is a schematic diagram of a steering apparatus according to an embodiment of the present disclosure.
Figure 5:
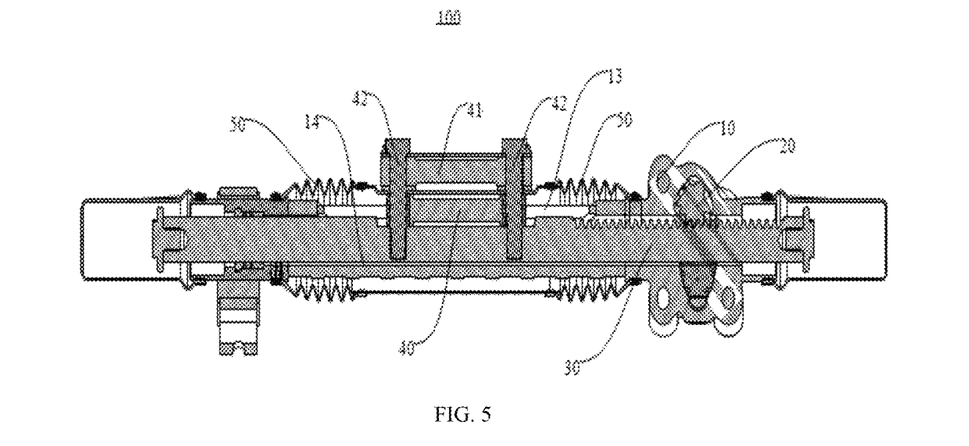
FIG. 5 is a cross-sectional view of a steering apparatus according to an embodiment of the present disclosure.
Figure 6:
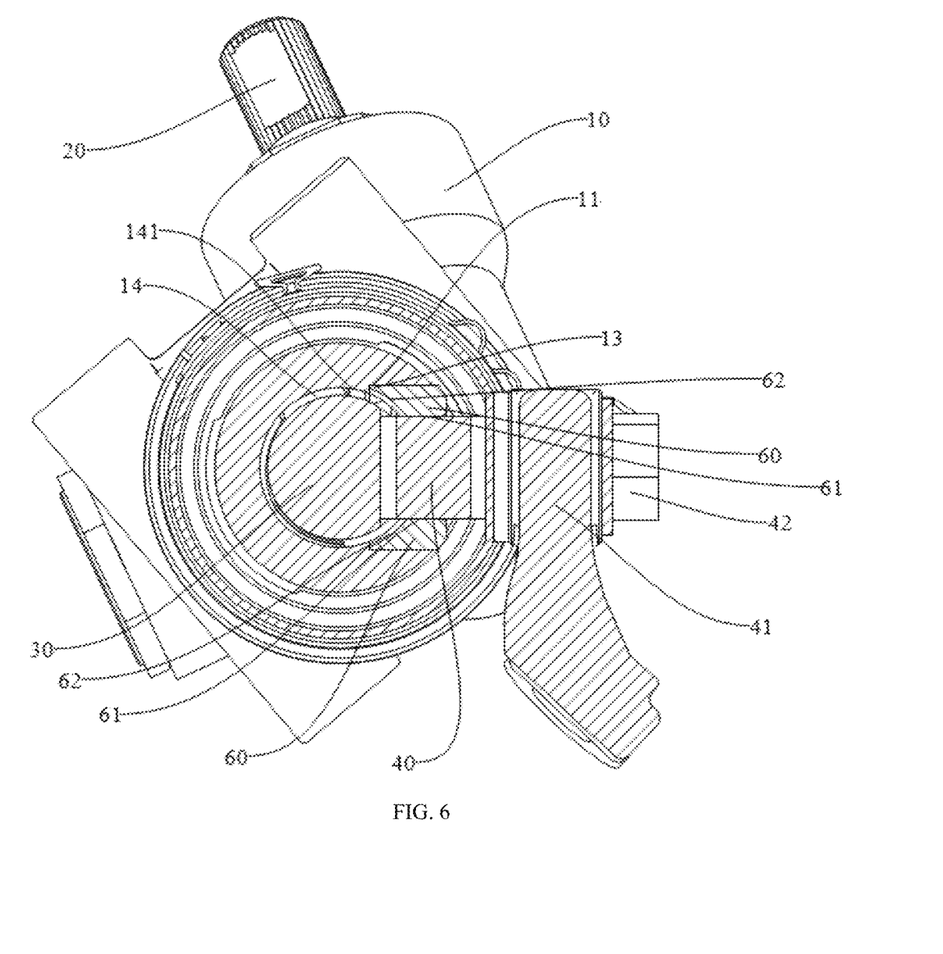
FIG. 6 is a cross-sectional view of a steering apparatus according to an embodiment of the present disclosure.

As shown in FIGS. 4-6, the steering apparatus 100 according to the embodiment of the present disclosure is described hereinafter, and the steering apparatus 100 can be applied to the all-terrain vehicle.

As shown in FIGS. 4-6, the steering apparatus 100 according to the embodiment of the present disclosure can mainly comprise a housing 10, an input shaft 20, an output shaft 30, a circumferential movement limiting member 40 and a structural reinforcement member 60, wherein the housing 10 is formed with an accommodating cavity 14 and a through hole 13, and the through hole 13 is in communication with the accommodating cavity 14. The input shaft 20 is disposed in the accommodating cavity 14. The output shaft 30 is disposed in the accommodating cavity 14 and is in transmission coupling with the input shaft 20. The output shaft 30 can move in the axial direction of the output shaft 30 in the accommodating cavity 14. Specifically, the housing 10 can separate the input shaft 20 from the output shaft 30 and the outside world, and can prevent the impact of external forces and the erosion of foreign substances from damaging the structures of the input shaft 20 and the output shaft 30, and prevent them from interfering with the transmission coupling between the input shaft 20 and the output shaft 30, thus improving the stability and reliability of the transmission cooperation between the input shaft 20 and the output shaft 30.

Further, the input shaft 20 and the output shaft 30 are provided with mutually meshed gear teeth. When the user needs to steer the all-terrain vehicle during driving, the input shaft 20 can rotate in the corresponding direction. The gear teeth rotating on the input shaft 20 will drive the gear teeth on the output shaft 30 to rotate, thus driving the output shaft 30 to convert the rotation into axial movement, realizing the transmission coupling between the output shaft 30 and the input shaft 20, further realizing the stable and reliable steering of the all-terrain vehicle, and improving the driving experience of users.

As shown in FIG. 5 and FIG. 6, the circumferential movement limiting member 40 is provided on the output shaft 30. The circumferential movement limiting member 40 moves axially synchronously with the output shaft 30 in the through hole 13. The structural reinforcement member 60 is disposed in the through hole 13. The structural reinforcement member 60 is provided with a reinforcement circumferential movement limiting part 61, and the circumferential movement limiting member 40 is in circumferential movement limiting fit with the reinforcement circumferential movement limiting part 61. Specifically, the structural reinforcement member 60 is disposed in the through hole 13, and the reinforcement circumferential movement limiting part 61 is disposed on the structural reinforcement member 60. In this way, when the output shaft 30 is subjected to an external force, and the output shaft tends to rotate circumferentially with respect to the housing 10, the circumferential movement limiting member 40 on the output shaft 30 will be in in circumferential movement limiting fit with the reinforcement circumferential movement limiting part 61 on the structural reinforcement member 60. The reinforcement circumferential movement limiting part 61 can prevent the circumferential rotation of the circumferential movement limiting member 40 and thus prevent the output shaft 30 from rotating circumferentially with respect to the housing 10, which not only can ensure that the installation of the output shaft 30 in the housing 10 is more stable and firm, but also can improve the impact resistance of the output shaft 30, reduce the wear between the output shaft 30 and the input shaft 20, reduce the rotation limit error, and further improve the structural reliability of the steering apparatus 100.

Further, compared with the direct movement limiting fit between the circumferential movement limiting member 40 and the through hole 13, by way of the structural reinforcement member 60 being disposed in the through hole 13, and the reinforcement circumferential movement limiting part 61 being in circumferential movement limiting fit with the circumferential movement limiting member 40, the strength of the reinforcement circumferential movement limiting part 61 for limiting the circumferential movement of the circumferential movement limiting member 40 is improved, further reducing the wear of the reinforcement circumferential movement limiting part 61, further increasing the maximum stress of the reinforcement circumferential movement limiting part 61, and further improving the reliability of the circumferential movement limiting member 40, in addition to ensuring the stability and reliability of the reinforcement circumferential movement limiting part 61 circumferentially limiting the circumferential movement limiting member 40.

Therefore, the structural reinforcement member 60 is disposed in the through hole 13, and the reinforcement circumferential movement limiting part 61 in in circumferential movement limiting fit with the circumferential movement limiting member 40 is disposed on the structural reinforcement member 60, so that on the premise that the reinforcement circumferential movement limiting part 61 limits the circumferential movement of the circumferential movement limiting member 40, the strength that the reinforcement circumferential movement limiting part 61 is in in circumferential movement limiting fit with the circumferential movement limiting member 40 can be improved, thereby improving the reliability of the steering apparatus 100.

As shown in FIG. 5 and FIG. 6, the reinforcement circumferential movement limiting part 61 is a slideway extending in the axial direction of the output shaft 30, and the circumferential movement limiting member 40 is disposed in the slideway and is slidable axially in the slideway. Specifically, the circumferential movement limiting member 40 is disposed in the slideway extending in the axial direction of the output shaft 30, so that the circumferential movement limiting member 40 not only can abut with and limit both ends of the slideway, thus limiting the circumferential rotation of the output shaft 30 in the housing 10, but also when the circumferential movement limiting member 40 abuts with and limits the slideway, make the circumferential movement limiting member 40 move axially along with the axial movement of the output shaft 30 in the slideway, which can prevent the movement limiting fit between the circumferential movement limiting member 40 and the reinforcement circumferential movement limiting part 61 from influencing the normal axial movement of the output shaft 30, thus improving the steering reliability of the steering apparatus 100.

As shown in FIG. 6, the housing 10 is provided with a circumferential movement limiting part 11 at the position corresponding to the through hole 13, and the bottom of the structural reinforcement member 60 is in radial limiting fit with the circumferential movement limiting part 11. Specifically, the bottom of the structural reinforcement member 60 is in radial limiting fit with the circumferential movement limiting part 11, so that not only the stability and firmness of the installation of the structural reinforcement member 60 at the through hole 13 can be improved, but also when the structural reinforcement member 60 is in in circumferential movement limiting fit with the circumferential movement limiting member 40, the radial limiting fit between the structural reinforcement member 60 and the circumferential movement limiting part 11 can make the circumferential movement limiting of the structural reinforcement member 60 and the circumferential movement limiting member 40 firmer and more stable, thus further improving the reliability of the structural reinforcement member 60.

As shown in FIG. 6, the circumferential movement limiting part 11 is a limiting step protruding toward the through hole 13, the limiting step is annular, or the limiting step is disposed on the opposite side walls of the through hole 13, and the limiting step extends in the axial direction. Specifically, the circumferential movement limiting part 11 is provided as a limiting step protruding toward the through hole 13, so that the structural reinforcement member 60 is disposed on the opposite side walls of the through hole 13, and the structural reinforcement member 60 is in movement limiting fit with the limiting steps on the opposite side walls of the through hole 13. In addition to ensuring the stable and reliable radial limit of the limiting steps on the structural reinforcement member 60, the limiting steps can be prevented from influencing the overall structure of the housing 10, and the limiting step can be prevented from occupying an excessive volume of the through hole 13, thus further improving the reliability of the steering apparatus 100.

In addition, the limiting steps extend in the axial direction, so that the limiting steps and the structural reinforcement member 60 can be limited in the axial direction, and the in circumferential movement limiting fit between the structural reinforcement member 60 and the circumferential movement limiting member 40 can be kept stable and reliable during the axial movement of the whole output shaft 30, thus further improving the reliability of the steering apparatus 100.

In some embodiments, as shown in FIG. 6, the side of the structural reinforcement member 60 facing the accommodating cavity 14 is a first arc-shaped surface 62, the accommodating cavity 14 is provided with a second arc-shaped surface 141, and the first arc-shaped surface 62 and the second arc-shaped surface 141 form a circle. Specifically, due to the process requirements, the housing 10 is cylindrical, and the circumferential side wall of the accommodating cavity 14 of the cylindrical housing 10 is arc-shaped. That is, the accommodating cavity 14 is provided with a second arc-shaped surface 141, so that the side of the structural reinforcement member 60 facing the accommodating cavity 14 is provided as the first arc-shaped surface 62, and the first arc-shaped surface 62 conforms to the bending extension angle of the second arc-shaped surface 141. Therefore, the first arc-shaped surface 62 and the second arc-shaped surface 141 form a circle. With this arrangement, the volume of the structural reinforcement member 60 itself can be guaranteed on the premise of ensuring that the structural reinforcement member 60 can stably and reliably circumferentially limit the circumferential movement limiting member 40 and the structural reinforcement member 60 will not affect the axial movement of the output shaft 30, so that the contact area of circumferential movement limiting between the structural reinforcement member 60 and the circumferential movement limiting member 40 can be increased. In this way, the role of circumferential movement limiting of the structural reinforcement member 60 and the circumferential movement limiting member 40 can be further enhanced.

In other embodiments, as shown in FIG. 6, the first arc-shaped surface 62 is located outside the circle where the second arc-shaped surface 141 is located, which can prevent the structural reinforcement member 60 from occupying the space in the accommodating cavity 14 so that the structural reinforcement member 60 will not affect the axial movement of the output shaft 30 on the premise of ensuring the stable and reliable in circumferential movement limiting fit between the structural reinforcement member 60 and the circumferential movement limiting member 40, thus further improving the reliability of the structural reinforcement member 60.

Further, the housing 10 is an aluminum housing 10, and the structural reinforcement member 60 is a steel structural reinforcement member. Specifically, the housing 10 is provided as an aluminum housing 10, which can reduce the manufacturing cost of the steering apparatus 100 and render the steering apparatus 100 lighter in addition to ensuring the structural strength of the housing 10. Further, the structural reinforcement member 60 is provided as a steel structural reinforcement member, so that the production cost of the steering apparatus 100 can be further reduced on the premise of ensuring the structural strength of the structural reinforcement member 60. In addition, the structural reinforcement member 60 is provided as a steel structural reinforcement member, and the structural reinforcement member 60 is provided with a reinforcement circumferential movement limiting part 61. In this way, when the circumferential movement limiting member 40 slides axially on the reinforcement circumferential movement limiting part 61 on the steel structural reinforcement member, the wear of the circumferential movement limiting member 40 can be further reduced. It should be noted that the structural reinforcement member 60 can also be other metal structures with high strength, which can be selectively set according to the production cost and specific process requirements.

In some embodiments, the structural reinforcement member 60 is cast in the through hole 13. This arrangement can simplify the production process of the steering apparatus 100 on the one hand. That is, it is not necessary to take a separate production step to provide the structural reinforcement member 60 in the through hole 13, which can facilitate the production and manufacture of the steering apparatus 100. On the other hand, this arrangement can improve the stability and firmness of the installation of the structural reinforcement member 60 in the through hole 13.

In some other embodiments, the structural reinforcement member 60 is embedded in the through hole 13, so that on the premise of ensuring the stability and reliability of the installation of the structural reinforcement member 60 in the through hole 13, different structural reinforcement members 60 can be selectively provided according to the through holes 13 of different sizes on the housings 10 made of different materials, thus improving the applicability of the structural reinforcement 60.

As shown in FIG. 5, the steering apparatus 100 can also mainly comprise a mounting bracket 41, wherein the mounting bracket 41 is configured to mount a steering rod, and the mounting bracket 41 is provided on the circumferential movement limiting member 40 and moves synchronously with the circumferential movement limiting member 40. Specifically, when the user needs to steer the all-terrain vehicle, the user can rotate the steering wheel, and then drive the input shaft 20 connected with the steering wheel to rotate, so that the gear teeth on the input shaft 20 can rotate. The gear teeth on the input shaft 20 is meshed with the gear teeth on the output shaft 30, so that the gear teeth on the output shaft 30 can rotate, and the rotation of the gear teeth on the output shaft 30 can be converted into the axial movement of the output shaft 30. Moreover, since the circumferential movement limiting member 40 is provided on the output shaft 30, the circumferential movement limiting member 40 will move axially along with the axial movement of the output shaft 30.

Further, since the steering rod is provided on the circumferential movement limiting member 40 through the mounting bracket 41, the steering rod can move axially together with the output shaft 30, so that the steering rod can pull the wheels to steer. The steering operation of the all-terrain vehicle can be thus realized, which not only makes the steering rod pull the wheels to steer more stably, but also makes the structure of the steering apparatus 100 more compact, so that the volume of the steering apparatus 100 can be further reduced, and the steering apparatus 100 can be conveniently mounted on the all-terrain vehicle.

As shown in FIG. 4 and FIG. 5, the steering apparatus 100 can also mainly comprise a dustproof sleeve 50, wherein the dustproof sleeve 50 is sleeved on the housing 10 and covers a through hole 13, the circumferential movement limiting member 40 is located inside the dustproof sleeve 50, and the mounting bracket 41 is located outside the dustproof sleeve 50. Specifically, the dustproof sleeve 50 covers the through hole 13, so as to separate the structural reinforcement member 60 and the components inside the housing 10 from the outside world, and prevent foreign matters from the outside world from eroding the structural reinforcement member 60 and the components inside the housing 10 and damaging the structural reinforcement member 60 and the components inside the housing 10, so that the service life of the steering apparatus 100 can be prolonged.

Further, the dustproof sleeve 50 is disposed between the circumferential movement limiting member 40 and the mounting bracket 41, which can prevent the dustproof sleeve 50 from influencing the fixed connection between the circumferential movement limiting member 40 and the mounting bracket 41 on the premise that the dustproof sleeve 50 reliably covers the structural reinforcement member 60 and the components inside the housing 10, and can prevent the dustproof sleeve 50 from influencing the axial movement of the circumferential movement limiting member 40 and the mounting bracket 41 along with the output shaft 30, thus improving the reliability and stability of the circumferential movement limiting member 40.

Further, the all-terrain vehicle according to the embodiment of the present disclosure can mainly comprise the steering apparatus 100 described above. The steering apparatus 100 is applied to the all-terrain vehicle, which can not only reduce the steering limit error of the all-terrain vehicle, but also improve the steering reliability of the all-terrain vehicle, and reduce the steering noise of the all-terrain vehicle. In addition, the structural strength of the all-terrain vehicle can also be improved, thus further improving the reliability of the all-terrain vehicle.

In the description of the present disclosure, it should be understood that the orientational or positional relationship indicated by the terms such as "center", "longitudinal", "transverse", "length", "width", "thickness", "upper", "lower", "front", "rear", "left", "right", "vertical", "horizontal", "top", "bottom", "inner", "outer", "clockwise", "anti-clockwise", "axial", "radial" "circumferential" is based on the orientational or positional relationship shown in the attached drawings, which is only used for the convenience of describing the present disclosure and simplifying the description, rather than indicating or implying that the referred apparatuses or elements must have a specific orientation, be constructed and operated in a specific orientation, and therefore should not be construed as limiting the present disclosure.

In the description of this specification, the description referring to the terms such as "one embodiment", "some embodiments", "illustrative embodiments", "examples", "specific examples" or "some examples" means that the specific features, structures, materials or characteristics described in conjunction with the embodiment or example are included in at least one embodiment or example of the present disclosure. In this specification, the schematic expressions of the above terms do not necessarily refer to the same embodiment or example.

Although the embodiments of the present disclosure have been shown and described, those skilled in the art can understand that many changes, modifications, substitutions and variations can be made to these embodiments without departing from the principles and purposes of the present disclosure, and the scope of the present disclosure is defined by the claims and their equivalents.

What is claimed is:
1. A steering apparatus, comprising:
a housing provided with a circumferential movement limiting part;
an input shaft disposed in the housing;
an output shaft disposed in the housing and being in transmission coupling with the input shaft, wherein the output shaft is movable axially in an axial direction of the output shaft in the housing; and a circumferential movement limiting member disposed on the output shaft and being in fit with the circumferential movement limiting part for limiting circumferential movement, wherein the circumferential movement limiting part is a through hole extending in the axial direction of the output shaft in the housing, and the circumferential movement limiting member is disposed in the through hole and is movable along the through hole when being driven by the output shaft.

2. The steering apparatus according to claim 1, wherein the through hole is an elongated hole, the elongated hole comprises two short side walls that are opposite in the axial direction and two long side walls that are opposite in a circumferential direction, and the two long side walls are provided with limiting surfaces in circumferential movement limiting fit with the circumferential movement limiting member for limiting circumferential movement.

3. The steering apparatus according to claim 1, further comprising a mounting bracket, wherein the mounting bracket is configured to mount a steering rod, and the mounting bracket is disposed on the circumferential movement limiting member and is movable synchronously with the circumferential movement limiting member.

4. The steering apparatus according to claim 3, further comprising a fastener, wherein the fastener passes through the mounting bracket, the circumferential movement limiting member and the output shaft.

5. The steering apparatus according to claim 4, further comprising a dustproof sleeve, wherein the dustproof sleeve is sleeved on the housing and covers the through hole, the circumferential movement limiting member is located inside the dustproof sleeve, and the mounting bracket is located outside the dustproof sleeve.

6. The steering apparatus according to claim 5, wherein the circumferential movement limiting member is block-shaped, the dustproof sleeve comprises telescopic sleeves and an intermediate sleeve, the telescopic sleeves are disposed at both ends of the intermediate sleeve and are fixedly connected with the housing respectively, the intermediate sleeve is provided with a flat plate-shaped fitting part, the top of the circumferential movement limiting member protrudes from the through hole, and the circumferential movement limiting member and the mounting bracket are fixedly attached to both sides of the fitting part respectively.

7. The steering apparatus according to claim 1, wherein the output shaft is provided with a concave fitting groove, and the circumferential movement limiting member is fitted in the fitting groove.

8. The steering apparatus according to claim 1, wherein the housing is further provided with an axial movement limiting part, the end of the output shaft is provided with an axial limiting member, and the axial movement limiting part is in an axial movement limiting fit with the axial limiting member.

9. The steering apparatus according to claim 1, further comprising a mounting bracket, wherein the mounting bracket is configured to mount a steering rod, and the mounting bracket is provided on the circumferential movement limiting member and is movable synchronously with the circumferential movement limiting member.

10. An all-terrain vehicle, comprising a steering apparatus wherein the steering apparatus comprises:
a housing provided with a circumferential movement limiting part;
an input shaft disposed in the housing;
an output shaft disposed in the housing and being in transmission coupling with the input shaft, wherein the output shaft is movable axially in an axial direction of the output shaft in the housing; and
a circumferential movement limiting member disposed on the output shaft and being in fit with the circumferential movement limiting part for limiting circumferential movement,
wherein the circumferential movement limiting part is a through hole extending in the axial direction of the output shaft in the housing, and the circumferential movement limiting member is disposed in the through hole and is movable along the through hole when being driven by the output shaft.

11. A steering apparatus, comprising:
a housing, forming an accommodating cavity and a through hole, wherein the through hole is in communication with the accommodating cavity;
an input shaft, disposed in the accommodating cavity;
an output shaft, disposed in the accommodating cavity and being in transmission coupling with the input shaft, wherein the output shaft is movable in an axial direction of the output shaft in the accommodating cavity;
a circumferential movement limiting member, disposed on the output shaft and received in the through hole, and is movable axially synchronously with the output shaft in the through hole;
a structural reinforcement member, disposed in the through hole, wherein the structural reinforcement member is provided with a reinforcement circumferential movement limiting part, and the circumferential movement limiting member is in in circumferential movement limiting fit with the reinforcement circumferential movement limiting part.

12. The steering apparatus according to claim 11, wherein the reinforcement circumferential movement limiting part is a slideway extending in the axial direction of the output shaft, and the circumferential movement limiting member is provided in the slideway and is slidable axially in the slideway.

13. The steering apparatus according to claim 11, wherein the housing is provided with a movement limiting part at the position corresponding to the through hole, and a bottom of the structural reinforcement member is in radial movement limiting fit with the movement limiting part.

14. The steering apparatus according to claim 13, wherein the movement limiting part is a limiting step protruding toward the through hole, and the limiting step is annular, or the limiting step is provided on opposite side walls of the through hole, and the limiting step extends in the axial direction.

15. The steering apparatus according to claim 11, wherein the side of the structural reinforcement member facing the accommodating cavity is a first arc-shaped surface of the reinforcement, the accommodating cavity is provided with a second arc-shaped surface, and the first arc-shaped surface of the reinforcement and the second arc-shaped surface form a circle.

16. The steering apparatus according to claim 11, wherein the housing is an aluminum housing, and the structural reinforcement member is a steel structural reinforcement member.

17. The steering apparatus according to claim 11, wherein the structural reinforcement member is cast in the through hole; or
the structural reinforcement member is embedded in the through hole.

18. The steering apparatus according to claim 9, further comprising a dustproof sleeve, wherein the dustproof sleeve is sleeved on the housing and covers the through hole, the circumferential movement limiting member is located inside the dustproof sleeve, and the mounting bracket is located outside the dustproof sleeve.

19. An all-terrain vehicle, comprising the steering apparatus according to claim 11.

\* \* \* \* \*